United States Patent
Long et al.

(10) Patent No.: US 7,140,993 B2
(45) Date of Patent: Nov. 28, 2006

(54) FLY-BY-WIRE LIMP HOME AND MULTI-PLEX SYSTEM

(75) Inventors: Charles F. Long, Pittsboro, IN (US); Phillip F. Mc Cauley, Zionsville, IN (US); Darren J. Weber, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 217 days.

(21) Appl. No.: 10/975,892

(22) Filed: Oct. 28, 2004

(65) Prior Publication Data

US 2006/0094555 A1   May 4, 2006

(51) Int. Cl.
*F16H 31/00* (2006.01)
(52) U.S. Cl. ...................... 475/119; 475/128
(58) Field of Classification Search ............... 475/119, 475/121–123, 128; 477/906
See application file for complete search history.

(56) References Cited

U.S. PATENT DOCUMENTS

| | | | |
|---|---|---|---|
| 4,070,927 A | 1/1978 | Polak | 74/765 |
| 4,827,806 A | 5/1989 | Long et al. | 74/869 |
| 5,601,506 A | 2/1997 | Long et al. | 475/120 |
| 5,616,093 A | 4/1997 | Long et al. | 475/120 |
| 5,911,244 A * | 6/1999 | Long et al. | 137/625.64 |
| 5,941,794 A * | 8/1999 | Jang | 477/143 |
| 6,077,182 A * | 6/2000 | Long et al. | 475/128 |
| 6,350,214 B1 * | 2/2002 | Murasugi | 475/128 |
| 6,394,926 B1 * | 5/2002 | Jang | 475/116 |
| 6,520,881 B1 | 2/2003 | Long et al. | 475/119 |

FOREIGN PATENT DOCUMENTS

EP     1061291     * 12/2000

* cited by examiner

*Primary Examiner*—Ha Ho
(74) *Attorney, Agent, or Firm*—Christopher DeVries

(57) ABSTRACT

An electro-hydraulic control mechanism for use with a multi-speed transmission includes a pair of logic valves, which are manipulated during the ratio interchanges and the ratio establishment by aiding in the distribution of fluid pressure from a plurality of trim valves. The logic valves are retained in specific drive ranges in the event of electrical discontinuance.

5 Claims, 10 Drawing Sheets

FLY-BY-WIRE LIMP HOME AND MULTI-PLEX SYSTEM

TECHNICAL FIELD

This invention relates to electro-hydraulic controls for transmissions, and more particularly, to controls having electronic mechanisms.

BACKGROUND OF THE INVENTION

Many of the currently-available high performance planetary transmissions employ what is termed clutch-to-clutch shifting. This term indicates that the ratio change is performed by disengaging one disc-type friction device while engaging another disc-type friction device. This is accomplished without the use of one-way devices. Therefore, the overlap control needs to be quite accurate in these situations and the position of the control must also be accurate.

At least one planetary transmission that is utilized with clutch-to-clutch shifting controls is shown in U.S. Pat. No. 4,070,927 issued to Polak on Jan. 31, 1978. This transmission has a control that is equipped with solenoid controlled trim valves that are actuated by electronic control units to provide engagement and disengagement pressures for the torque-transmitting friction devices within the transmission. One such solenoid control is shown in U.S. Pat. No. 5,601,506 issued to Long et al. on Feb. 11, 1997. Also, the transmissions in this category use what is known as skip shifting, that is, a first-to-third ratio interchange or a second-to-fourth ratio interchange. The above-identified Long et al. patent does not provide for skip shifting.

It is also desirable to ensure that the vehicle incorporating these transmissions can be returned to a repair facility in the event of a discontinuance of electrical power, which is known as limp home capability. Such control systems can be found in U.S. Pat. No. 4,827,806 issued to Long et al. on May 9, 1989, and U.S. Pat. No. 5,616,093 also issued to Long et al. on Apr. 1, 1997.

The transmission controls utilize trim valves, which are operating in combination with shift valves to control the on-coming and off-going friction devices. The trim valves are equipped with variable pressure solenoids while the shift valves are controlled by on/off-type solenoid valves.

U.S. Pat. No. 6,520,881 issued to Long et al. on Feb. 18, 2003, describes a control system wherein four solenoid valves control four trim valves, which in turn control the on-coming and off-going pressures in five torque-transmitting mechanisms. This control mechanism incorporates two latching valves, which are multi-plexed to control fluid pressure distribution to three torque-transmitting mechanisms. Limp home capability is provided by the control system disclosed in this Patent. The control of U.S. Pat. No. 6,520,881 will permit limp home capability in either the third or fifth forward ranges

SUMMARY OF THE INVENTION

It is an object of the present invention to provide an improved electro-hydraulic control mechanism for a multi-speed power transmission having limp home capability.

In one aspect of the present invention, a pair of logic valves that are positionable to direct fluid to the desired torque-transmitting mechanisms, during normal operation, will assume a neutral condition in the event of electrical discontinuance from either neutral or reverse range.

In another aspect of the present invention, the logic valves will assume a third range condition in the event of electrical discontinuance of electrical signals during normal operation in either first, second, or third range.

In yet another aspect of the present invention, the logic valves will assume a fourth range condition in the event of electrical discontinuance during normal fourth range operation.

In still another aspect of the present invention, the logic valves will assume a fifth range condition in the event of electrical discontinuance during normal operation in either fifth or sixth range.

DESCRIPTION OF AN EXEMPLARY EMBODIMENT

Figure 1:
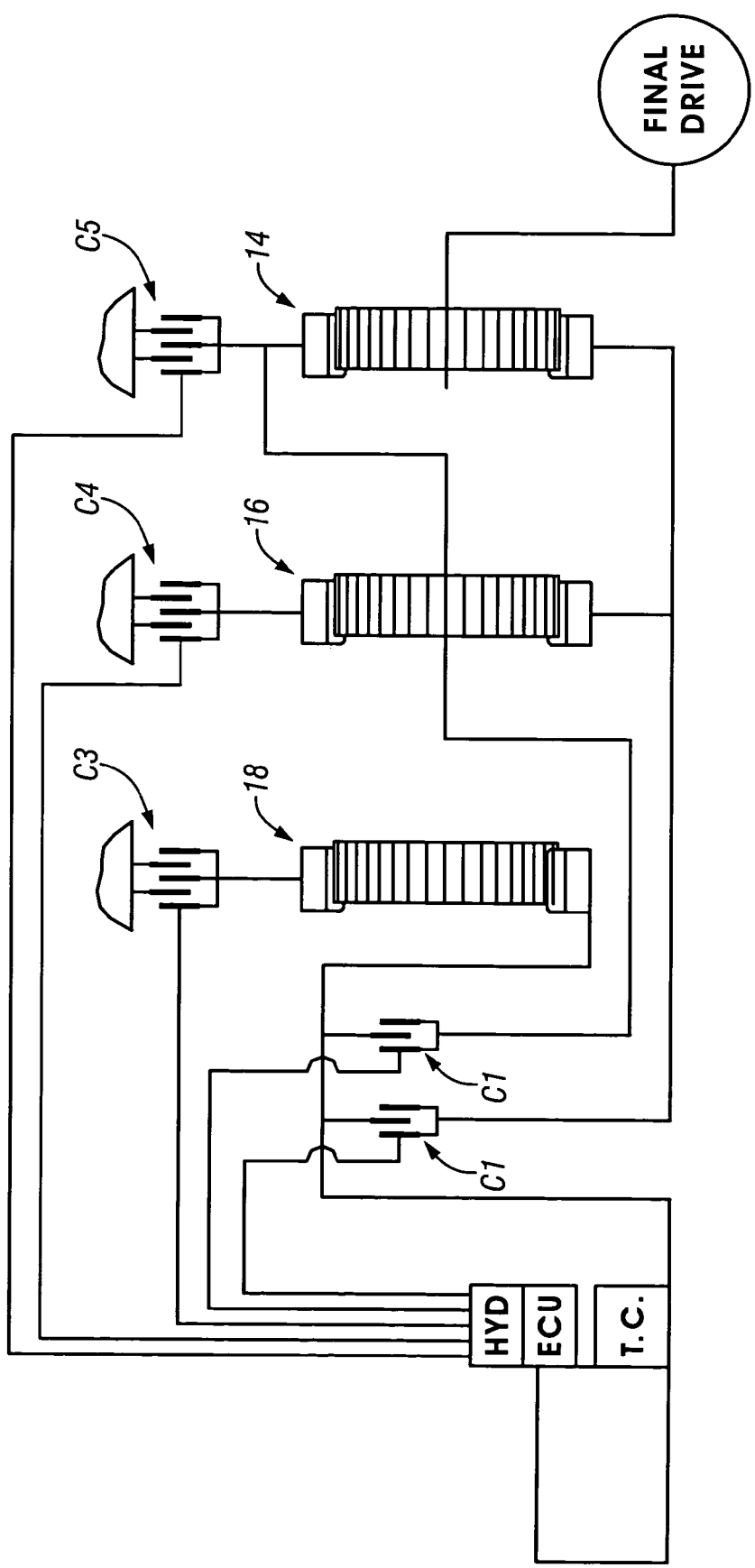
FIG. 1 is a schematic representation showing a multi-speed power transmission incorporating the present invention.

A power transmission shown in FIG. 1 includes an engine and torque converter (TC), an input shaft 10, an output shaft 12, and three planetary gearsets 14, 16, and 18. The planetary gearsets 14, 16, and 18 are controlled to provide six forward speed ratios, a reverse speed ratio, and a neutral condition between the input shaft 10 and the output shaft 12. These conditions are provided by five torque-transmitting mechanisms C1, C2, C3, C4, and C5. The torque-transmitting mechanisms C1 and C2 are rotating-type torque-transmitting mechanisms commonly termed clutches, and the torque-transmitting mechanisms C3, C4, and C5 are stationary-type torque-transmitting mechanisms commonly termed reaction clutches or brakes.

To establish a reverse ratio, the torque-transmitting mechanisms C3 and C5 are engaged. In the neutral condition, the torque-transmitting mechanism C5 is engaged. During the neutral to first ratio interchange, the solenoid is activated to place the logic valve 30 in the stroked position. For the first forward ratio, the torque-transmitting mechanisms C1 and C5 are engaged. During the first to second interchange, the solenoid 72 is deactivated but the logic valve 30 is latched by the pressure acting on the differential area between lands 30B and 30C. To establish the second forward ratio, the torque-transmitting mechanisms C1 and C4 are engaged, and the solenoid valve is activated to place the logic valve 80 in the stroked position. To establish the third forward range, the torque-transmitting mechanisms C1 and C3 are engaged. The torque-transmitting mechanism C3 is controlled by the trim valve 34. To establish the fourth forward range, the torque-transmitting mechanisms C1 and C2 are engaged. Engagement of the torque-transmitting mechanism C2 latches the logic valve 80 in the stroked position. During the fifth forward range, the torque-transmitting mechanisms C2 and C3 are engaged. The trim valve 38, which was on in the fourth range, is turned off and the latch pressure on the logic valve 30 is released. During the sixth range, the torque-transmitting mechanisms C2 and C4 are engaged. The logic valve 30 is conditioned by the solenoid 72 to a low pressure state. A more complete description of the power transmission can be found in U.S. Pat. No. 4,070,925.

The torque-transmitting mechanisms C1, C2, C3, C4, and C5 are all selectively engageable hydraulically controlled torque-transmitting mechanisms, which are well known in the art of power transmissions. The hydraulic fluid to engage these torque-transmitting mechanisms is provided by an electro-hydraulic control mechanism 20 that includes an electronic control unit (ECU) which incorporates a programmable digital computer to provide electronic signals to a hydraulic control (HYD) which in turn distributes the hydraulic fluid to various torque-transmitting mechanisms as required by the driving conditions.

The ECU receives a number of input signals from the engine, torque converter, and also the transmission elements in the vehicle, which partially determine the electronic signals that are generated and distributed to the hydraulic system to provide for upshifting and downshifting of the transmission by controlling the engagement and disengagement of the torque-transmitting mechanisms.

Figure 2:
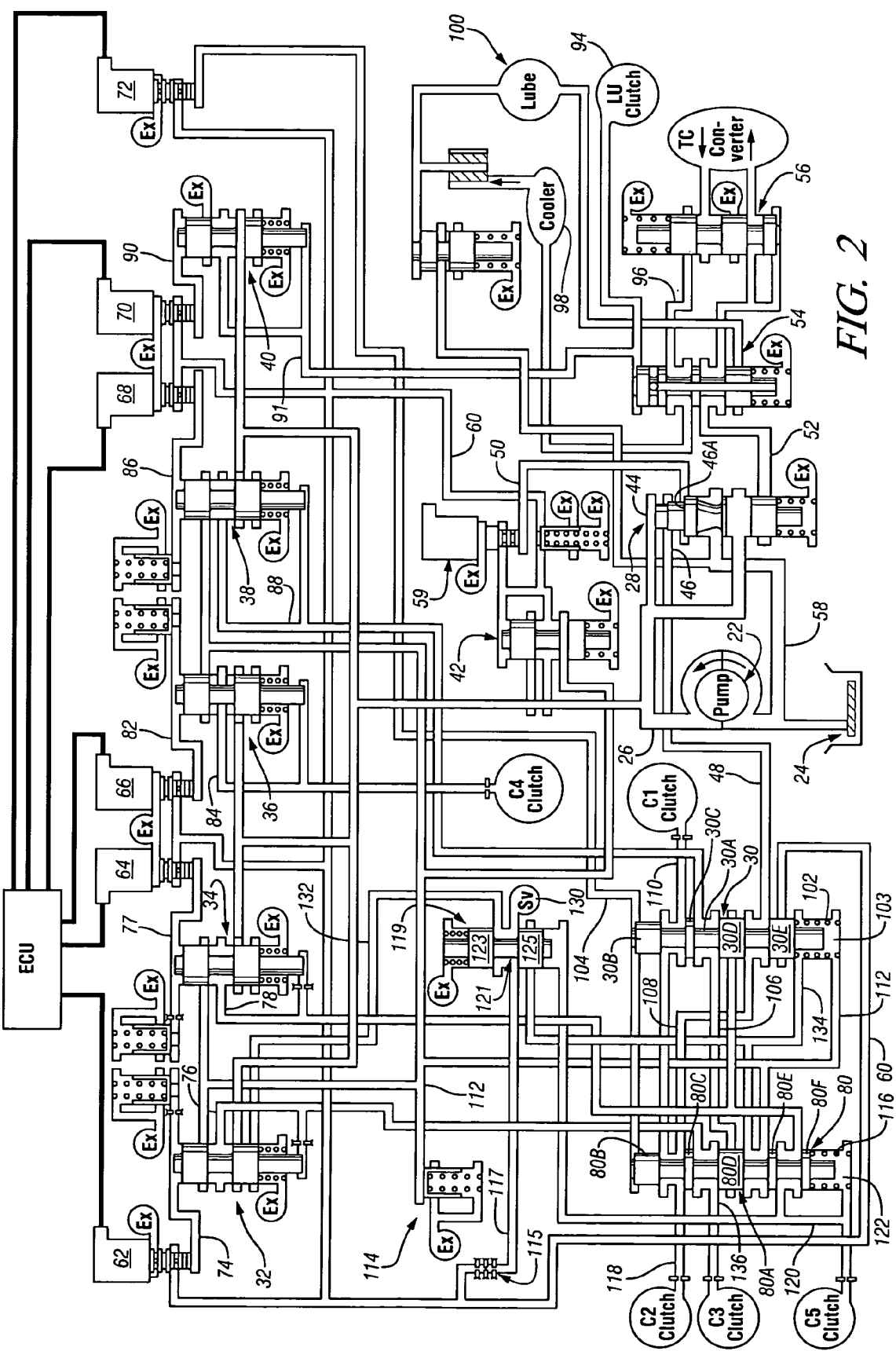
FIG. 2 is a diagrammatic representation of an electronic control system incorporating the present invention and utilized with the power transmission shown in FIG. 1 and conditioned for neutral.

As seen in FIG. 2, the hydraulic portion of the electro-hydraulic control 20 includes a pump 22, which withdraws hydraulic fluid from a reservoir 24 for distribution through a main passage 26. The main passage 26 is in continuous fluid communication with a main regulator valve 28 and five trim valves 32, 34, 36, 38, and 40, and a control regulator valve 42. The main regulator valve 28 is effective to set the maximum system pressure within the passage 26. The main regulator valve 28 has a bias area 44 on the upper end of the valve 28, a differential bias area 46 that is in fluid communication with a latch or logic valve 30 through a passage 48. The valve 28 has a second differential bias area 46A that is in fluid communication with a passage 50.

The pressure regulator valve 28 supplies fluid pressure to the main passage 26 and when the pressure in that passage has been satisfied, the regulator valve 28 distributes fluid pressure to a passage 52 that is in communication with a torque converter flow valve 54 which in turn communicates with a converter regulator valve 56 which in turn distributes fluid to a torque converter (TC). If there is excess fluid after the torque converter (TC) is satisfied, the remaining fluid is distributed through the sump 24 to a return passage 58.

The passage 50 is also in communication with a line modulator valve 59. The line modulator valve 59 is a conventional solenoid controlled valve, which is a normally closed valve; that is, the fluid pressure in passage 50 is essentially zero when the line modulator valve 59 is inoperable The solenoid valve 62 is controlled by the ECU to establish a control pressure in a passage 74, which determines the fluid pressure distributed from the trim valve 32 to a passage 76, which is in communication with a latch or logic valve 80. The solenoid valve 62 is a normally on solenoid that has maximum output pressure when there is no electrical power delivered thereto. The solenoid valve 64 distributes fluid pressure in a passage 77 that is distributed to trim valve 34 to control the pressure in a passage 78, which is in fluid communication with the logic valves 30 and 80. The solenoid valve 66 controls fluid pressure in a passage 82, which is effective to establish the output pressure of the trim valve 36 and a passage 84 that is in fluid communication with the torque-transmitting mechanism C4. The solenoid valves 64, and 66 are normally off mechanisms. The solenoid valve 68 distributes fluid pressure to a passage 86, which is effective to establish the output pressure of the trim valve 38, which is distributed through a passage 88 to the logic valve 30. The solenoid valve 68 is a normally on mechanism, thus producing a maximum output signal when the electrical signal is off. The solenoid valve 70, a normally off solenoid, is effective to control pressure in a passage 90, which establishes an outlet pressure of the trim valve 40 in a passage 91 for distribution through the converter flow valve 54 and a torque converter clutch (LU) 94. When the converter flow valve 54 is in the spring set position shown, the pressure in passage 52 is distributed through the valve 54 and the valve 56 to the torque converter (TC).

Flow out of the torque converter (TC) is distributed through a return passage 96 and through the converter flow valve 54 to a cooler 98. The fluid returning from the cooler 98 passes through a lube circuit 100, which distributes fluid to lubricate the various components of the transmission such as gears and bearings.

The logic valve 30 includes a valve spool 30A, which is slidably disposed in a valve bore and urged to a spring set position shown by a spring 102 and to a pressure set position by fluid pressure acting in a passage 104 on the upper end of the valve spool 30. The passage 104 communicates with the solenoid valve 72, which is a conventional on/off-type solenoid valve such that the fluid pressure in passage 104 is either essentially zero or an established control pressure, which is set in passage 60 by the control regulator valve 42. The solenoid 72 is a normally off device. The spring 102 is disposed within a spring chamber 103.

As mentioned above, the solenoid valve 72 is an on/off-type solenoid and while the solenoid valves 62, 64, 66, 68, and 70 are variable type solenoid valves, which distribute a variable control signal depending upon the electrical signal received from the electronic control unit. The solenoid valves 62 and 68 are normally open-type valves, which means that the control signal generated from these valves is maximum when the electronic signal conducted thereto is minimum. The solenoid valves 64, 66, and 70 are normally off-type solenoid valves, which means that the pressure distributed thereby is minimum when the electronic control signal directed thereto is minimum.

In the spring set position shown, the fluid in passage 88 is distributed through the valve 30 to a passage 106, which communicates with the logic valve 80. The logic valve 30 has four lands formed thereon, 30B, 30C, 30D, and 30E. The logic valve 80 has a valve spool 80A, which includes five valve lands 80B, 80C, 80D, 80E, and 80F. The valve spool 80A is operated on by a spring 116 which is disposed in a spring pocket or chamber 122. The passage 48 communicates between the passages 30D and 30E of the valve spool 30A in the spring set position with a passage 108, which in turn communicates between passages 80B and 80C in the spring set position of valve 80, and with an exhaust passage 112, which also communicates between the lands 30B and 30C through a passage 110 with the torque-transmitting mechanism C1. Thus, in the spring set position of the valves 30 and 80, the torque-transmitting mechanism C1 and C2 inoperable.

The passage 112 communicates with an exhaust valve 114, the trim valves 32, 34, 36, and 38, and the control regulator valve 42. The exhaust valve 114 establishes a minimum pressure within the control system such that the torque-transmitting mechanisms have disposed therein or fed thereto a minimum pressure, which simplifies the engagement and disengagement control of the torque-transmitting mechanism. The use of a back fill exhaust valve to maintain a minimum pressure within torque-transmitting mechanisms is well known in the art.

The control regulator valve 42, as previously mentioned, distributes a reduced pressure from the main pressure in passage 26 to the passage 60. Passage 60 communicates with the solenoid valves 62, 64, 66, 68, 70, and 72. The solenoid valves operate in a well-known manner to control the output pressure from the respective valves to their control passages by reducing the pressure in passage 60 to the respective output pressures of the solenoid valves. The passage 60 also communicates with the logic valve 30. The logic valve 30 blocks the passage 60 in the spring set position by the valve land 30E. The passage 60 also communicates through a multiple restriction 115 with a passage 117, which communicates in turn with a diagnostic valve 119.

The diagnostic valve 119 has a valve spool 121, which includes spaced valve lands 123 and 125. The passage 117 communicates between the valve lands 123 and 125 and in the pressure set position shown in FIG. 2, communicates between the valve lands 123 and 125 with a pressure switch 130. The pressure switch 130 is connected with the ECU and provides a signal thereto which indicates the pressure in the passage 117.

The diagnostic valve 119 also communicates with a passage 132, which is connected with the trim valve 32 and with a passage 134, which communicates with the spring chamber 103 of valve 30. The spring chamber 103 also communicates with the passage 112, which in turn communicates with the logic valve 80. In the pressure set position of the valve 119, the valve land 125 blocks the passage 134 from reaching the passage 117 while the passage 132 is open between the valve lands 123 and 125 with the passage 117. Thus, when valve 32 is in the spring set position, the pressure at the switch 130 is at an exhaust value, which is determined by the pressure in the passage 132. In the spring set position of the diagnostic valve 119, the pressure in the passage 117 and therefore the switch 130 is determined by the pressure in passage 134.

The passage 112 communicates with the logic valves 30 and 80 in a plurality of locations. In the spring set position shown for the valves 30 and 80, the exhaust passage 112 communicates between the lands 30B and 30C and between the lands 80B and 80C. The exhaust passage 112 also communicates between the lands 80D and 80E when the valve 80 is in the spring set position. Thus, in the spring set position for both valves 30 and 80, the passage 112 communicates with the passage 134, which will connect with the diagnostic switch 130 when the valve 119 is in the spring set position.

The logic valve 80 communicates with the torque-transmitting mechanism C2 through a passage 118, with the torque-transmitting mechanism C3 through a passage 136, and with the torque-transmitting mechanism C5 through a passage 120. The passage 120 communicates with the spring chamber 122 and in a spring set position of valve 80 communicates with a passage 78, which in turn delivers fluid pressure from the trim valve 34. The passage 76, which distributes fluid pressure from the trim valve 32 communicates with the logic valve 80 in the spring set position between the lands 80C and 80D, which in turn communicates with the passage 136 and therefore torque-transmitting mechanism C3.

In the pressure set position of the logic valve 80, the passage 76 communicates between the lands 80B and 80C with the torque-transmitting mechanism C2. It will be noted that the land 80B is smaller in diameter than the land 80C, thus once the valve 80 is in the pressure set position and the torque-transmitting mechanism C2 is engaged, the pressure in passages 76 and 118 will latch the valve 80 in the pressure set position.

The logic valve 30 is in fluid communication with the passage 88 between the lands 30C and 30D in the spring set position of valve spool 30A. The passage 88, as previously commented, delivers control fluid pressure from the trim valve 38. The pressure in passage 88 is distributed between the valves 30C and 30D to the passage 106 when the valve 30 is in the spring set position. Passage 106 is blocked by the land 80D when the valve 80 is in the spring set position. However, when the valve 80 is in the pressure set position, the passage 106 communicates with the torque-transmitting mechanism C3. In the spring set position of the valve 80, the passage 76 is fluid communication with the torque-transmitting mechanism C3.

As noted, the hydraulic control shown in FIG. 2 is in the neutral condition. In this condition, the torque-transmitting mechanism C5 is held in controlled engagement by the trim valve 34 through the passage 78 between the lands 80E and 80F in the passage 120. The passage 120 also communicates with the diagnostic valve 119, which places the valve 119 in the pressure set position. In the neutral condition, the trim valve 32 is inoperable and therefore the passage 76 is connected with exhaust through the trim valve 32.

To condition the transmission for reverse operation, the trim valve 32 is made active by the solenoid 62, which does two things. First, it distributes control fluid pressure through the passage 76 to the torque-transmitting mechanism C3 through the logic valve 80 to enforce engagement thereof. When the torque-transmitting mechanisms C3 and C5 are engaged, the transmission shown in FIG. 1 is conditioned for reverse second, the trim valve 32 blocks the exhaust of passage 132 and therefore prevents flow of fluid through the restriction 115, which of course raises the pressure within the passages 117 and 132 and the diagnostic switch 130. Thus, in reverse, the diagnostic switch 130 is energized indicating to the control system that the system is operating properly in reverse.

To establish the first and lowest forward range, the control mechanism is operated to engage the torque-transmitting mechanism C1 through the operation of the trim valve 38 which is responsive to the control pressure from the solenoid valve 68. When the transmission is shifted from the neutral to the forward range, the solenoid valve 72 is energized, which emits a control pressure to the passage 104 and to the valve lands 80B and 30B. In the first range of operation, the logic valve 30 is shifted to the pressure set position. However, the logic valve 80 cannot shift to the pressure set position because of the fluid pressure in the spring chamber 122, which is equal to the pressure in the torque-transmitting mechanism C5 and establishes a greater force on the valve spool 80A than the pressure acting on the valve land 80B. The trim valve 68 is operated to control the engagement of the torque-transmitting mechanism C1 such that the transmission operates in the first forward range. When the trim valve 38 energizes the torque-transmitting mechanism C1, the trim valve 32 de-energizes the torque-transmitting mechanism C3, thus returning the passage 132 to the exhaust condition, which exhausts the diagnostic switch 130 and the passage 117, and informs the ECU that the reverse range of operation has been de-activated. When the transmission is operating in first range, fluid pressure in the passage 60 is directed through the valve 30 between the lands 30D and 30E to the passage 48 and the bias area 46 thereby affecting the regulation pressure of the system at the regulator valve 28. In first range, the maximum system pressure is reduced by the bias pressure.

During a ratio interchange from first-to-second, the torque-transmitting mechanism C4 is brought into controlled engagement by the trim valve 36 while the torque-transmitting mechanism C5 is disengaged in a controlled manner by the trim valve 34. Upon completion of the first-to-second interchange, the torque-transmitting mechanism C5 is fully disengaged such that the logic valve 80 is moved to the pressure set position. When the torque-transmitting mechanism C5 is disengaged, the diagnostic valve 119 is moved to the spring set position thereby permitting fluid pressure to be developed within the passage 117 and also within the passage 134. The switch is now activated indicating the stroke of the valve 80 has been completed In the third range of operation, the logic valves 30 and 80 are both in the pressure set position thereby permitting the trim valve 34 to control the engagement of the torque-transmitting mechanism C3. This control pressure is effective in the passage 78 between the lands 30C and 30D and into passage 106 and then between lands 30C and 30D into the passage 136 and torque-transmitting mechanism C3. During the third range of operation, the diagnostic valve 119 remains in the spring set position and the switch 130 remains activated.

As the ratio interchange from third range to fourth range is accomplished by controlled disengagement of the torque-transmitting mechanism C3 by the trim valve 34 and the controlled engagement of the torque-transmitting mechanism C2 by the trim valve 32, the trim valve 32 distributes pressure through the passage 76 between the lands 80B and 80C through the passage 118 and thus the torque-transmitting mechanism C2. During the fourth range of operation, the diagnostic valve 119 remains in the spring set position and the switch 130 remains activated and the fluid pressure on the bias 46 remains controlled.

The fifth range of forward operation is established by the controlled disengagement of the torque-transmitting mechanism C 1 by operation of the trim valve 38, and the controlled engagement of the torque-transmitting mechanism C3 by the controlled operation of the trim valve 34. As with the third range of operation, the torque-transmitting mechanism C3 is engaged by the fluid pressure in passage 78 passing through the logic valve 30 to the passage 106 and then through the logic valve 80 to the passage 136. During the fifth range of operation, the diagnostic valve 119 remains in the spring set position and the switch 130 remains pressurized or activated.

The sixth range of operation is established by the controlled disengagement of the torque-transmitting mechanism C3 by the trim valve 34 and the controlled engagement of the torque-transmitting mechanism C4 by the trim valve 36. During the fifth ratio to sixth ratio interchange, the diagnostic valve 119 remains in the spring set position and the switch 130 remains activated. However, upon reaching the sixth range of operation, the solenoid valve 72 is conditioned to the "off" mode thereby eliminating the pressure bias on the valve lands 30B and 80B. The valve 80 remains in the latched condition due to the pressure in the torque-transmitting mechanism C2, which operates on the bias area between valve lands 80B and 80C. The logic valve 30, however, has no such bias at this point and returns to the spring set position. In the spring set position, the spring chamber 103 communicates with the passage 134 and thereby exhausts the pressure within that passage such that insufficient flow through the restriction 115 is permitted and the diagnostic switch 130 is moved to the "off" position or deactivated condition indicating that the valve 30 has moved to the spring set position.

Thus, as described above, the diagnostic pressure switch 130 is activated during reverse, is deactivated during neutral, is deactivated during the first-to-second ratio interchange, is activated during the second range, is activated during the fifth-to-sixth ratio interchange, and is deactivated upon achieving sixth range.

When operating in reverse, if the electronic power should be discontinued for some reason, the solenoid valves 62 and 68 will produce maximum outlet pressure at their respective trim valves 32 and 38. Thus, should the power be eliminated in reverse or neutral, the torque-transmitting mechanism C3 is engaged by the trim valve 32 while all other torque-transmitting mechanisms are discontinued. Also, under this condition, should the power be eliminated, the passage 134 is connected through the spring chamber 103 with the exhaust passage 112 and therefore the diagnostic switch 130 is deactivated indicating that the reverse ratio has not been achieved since during normal operation the switch is activated in reverse.

Should a power discontinuance occur during first through third forward ratios, the trim valve 38 will maintain the torque-transmitting mechanism C1 engaged, however, the logic valve 80 will return to the spring set position due to loss of control pressure on land 80B and the trim valve 32 will engage the torque-transmitting mechanism C3 thereby conditioning the transmission to third ratio, however, the passage 134 is exhausted through the logic valve 80 between lands 80D and 80E, which communicates with the exhaust passage 112. Thus, on a power discontinuance at the control system, the switch 130 will be deactivated, however, the transmission control will indicate third ratio and since the switch 130 should be activated, the operator will be informed that some malfunction has occurred within the transmission control.

If an electronic malfunction should occur during fourth ratio, the valves 30 and 80 will both have been latched in the pressure set condition and will remain that way since the trim valves 32 and 38 will charge the differential areas of the respective logic valves during minimum electronic input to the solenoid valves 62 and 68. If a malfunction should occur during fifth ratio or sixth ratio, the torque-transmitting mechanism C2, which was in a latched condition during fifth or sixth ratio, will remain so since the fluid pressure distributed by the trim valve 32 will remain at maximum, and the trim valve 38 will distribute maximum pressure through the passage 88 which connects between the lands 30C and 30D of the logic valve 30 with the passage 106 and then between the lands 80C and 80D through the torque-transmitting mechanism C3. Note that on a malfunction, the hydraulic bias through the logic valves 30 and 80 is discontinued and this pressure is discontinued during sixth range of operation in any situation.

The passage 134 will be exhausted through the spring chamber 103, thus deactivating the switch 130. However, the transmission will indicate that fifth range of operation is attained but the switch 130 is de-energized and therefore a malfunction has occurred and the system will inform the operator of this condition.

Upon the recognition of a malfunction, the diagnostic switch 130 can be interrogated under various conditions to determine where the malfunction might be. During the diagnostics, the torque-transmitting mechanism C5 is engaged thereby placing the diagnostic valve 119 in the pressure set position. If the solenoid valve 62 has malfunctioned to the closed position, the trim valve 32 will not issue a control pressure and the switch 130 will be exhausted through the passage 132. If the solenoid 62 cannot be taken from the high state, the maximum output pressure will be produced at the trim valve 32 thereby blocking the passage 132 from the valve 119 indicating that the trim valve is pressurized when in fact the command is calling for it to be depressurized.

Also, during diagnostic testing, the torque-transmitting mechanism C5 can be placed in the unapplied position and if both valves 30 and 80 are destroked to the spring set position, the switch 130 is exhausted and remains in the de-energized state. If the logic valve 30 is stroked to the pressure set position and the logic valve 80 is spring set, the switch 130 is exhausted through the logic valve 80 and will remain in the de-energized state. If the logic valve 80 is stroked to the pressure set position and the logic valve 30 is destroked, this will allow the diagnostic switch 130 to be exhausted to the logic valve 30 and the valve will remain in the de-energized state. If both the logic valves 30 and 80 are in the latched or stroked position, this blocks the exhaust path for the pressure switch and results in pressure switch actuation.

These diagnostic techniques thereby indicate the positioning of the valves and permit the diagnostician to determine where a malfunction may have occurred. There are three times when it is important that malfunctions are detected. In neutral, a single point malfunction in the control circuit or trim valve 32 could permit a shift to reverse, however, the pressure at the switch 130 will detect this before the fill begins to prevent such action knowing that a neutral condition has been commanded. The logic valve 80 goes through transition after the first-to-second shift and before the second-to-first shift. The pressure switch changes state during this transition and thereby provides a positive feedback to the electronic control mechanism to inform the system that the shift is occurring. The logic valve 30 undergoes a transition after the fifth-to-sixth interchange and before the sixth-to-fifth interchange. The diagnostic switch 130 changes states during the transition and thereby provides a feedback signal to the electronic control mechanism to indicate that the shift is occurring.

Figure 3:
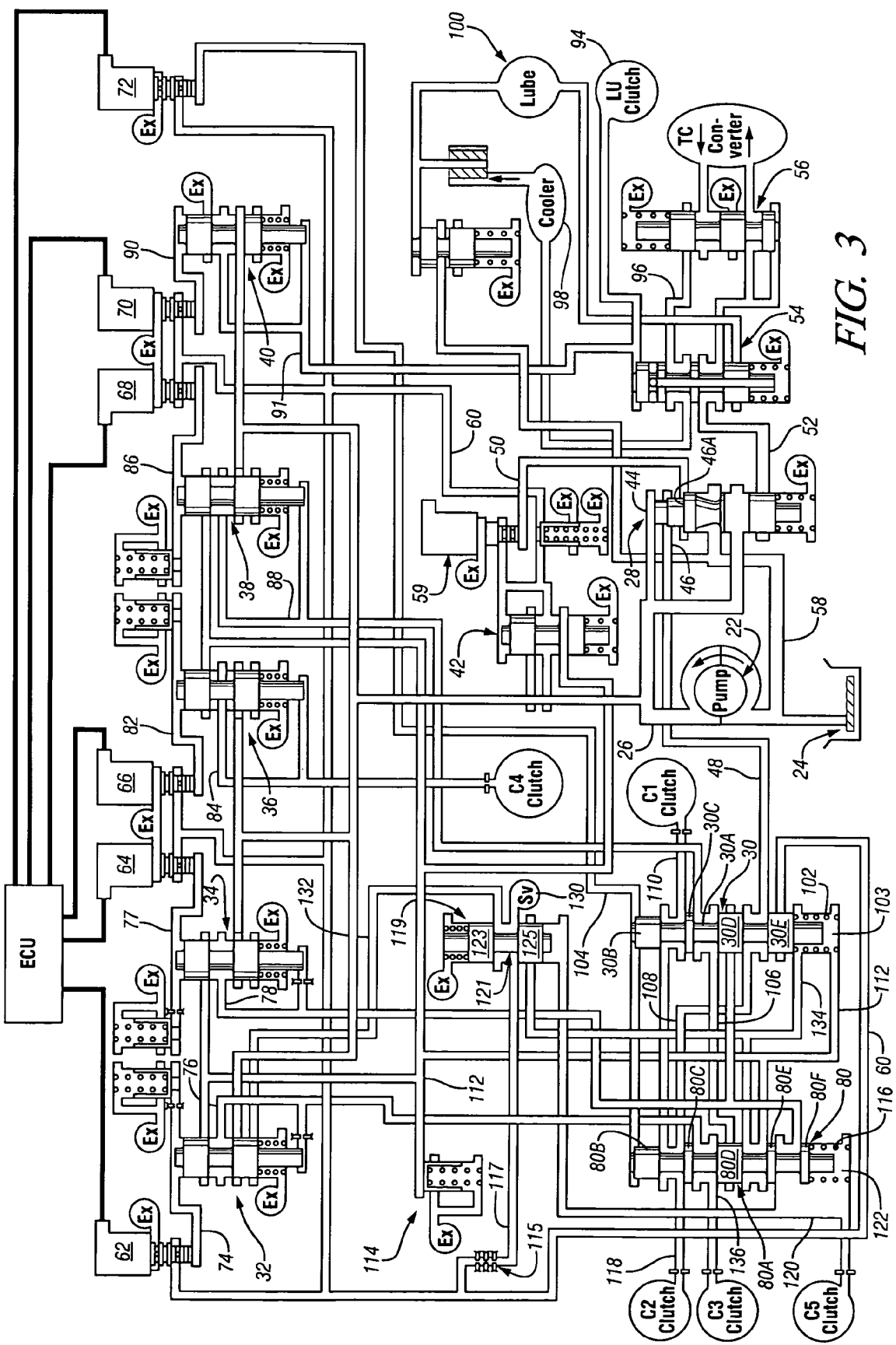
FIG. 3 is a diagrammatic representation of an electronic control system incorporating the present invention and utilized with the power transmission shown in FIG. 1 and conditioned for reverse.
Figure 4:
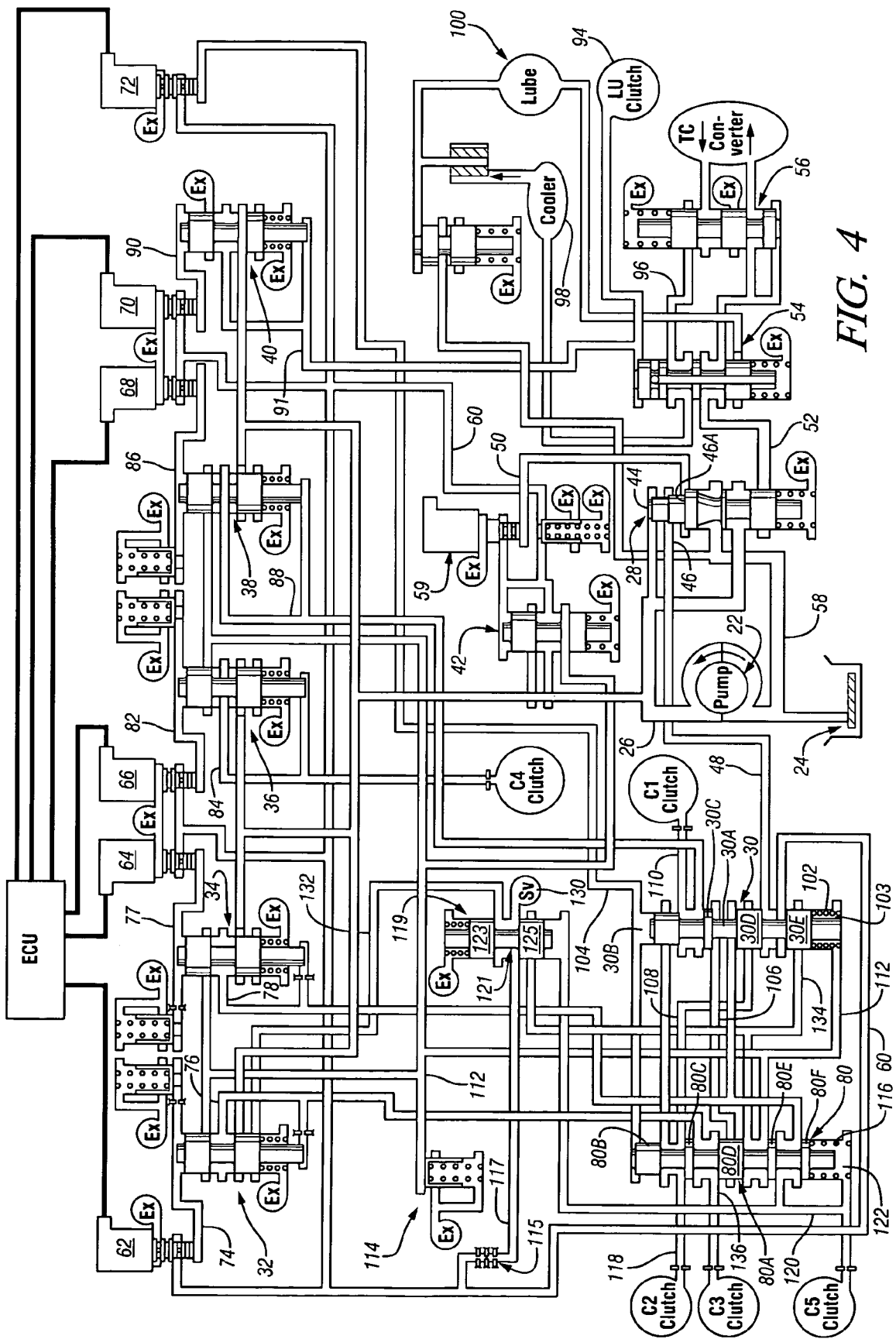
FIG. 4 is a diagrammatic representation of an electronic control system incorporating the present invention and utilized with the power transmission shown in FIG. 1 and conditioned for first.

In FIG. 3, the electro-hydraulic control is shown in the Reverse ratio operation. Both of the logic valves 30 and 80 are in the unstroked position, the trim valve 34 supplies fluid to the torque-transmitting mechanism C5, and the trim valve 32 supplies fluid to the torque-transmitting mechanism C3. In FIG. 4, the electro-hydraulic control is shown in the first forward range. The logic valve 80 is blocked in the unstroked position by pressure at torque-transmitting mechanism C5 and the torque-transmitting mechanism C1 is supplied by the trim valve 38, and the solenoid valve 72 is actuated during the neutral to first range interchange. The pressure from the trim valve 38 latches the logic valve 30 in the stroked position.

Figure 5:
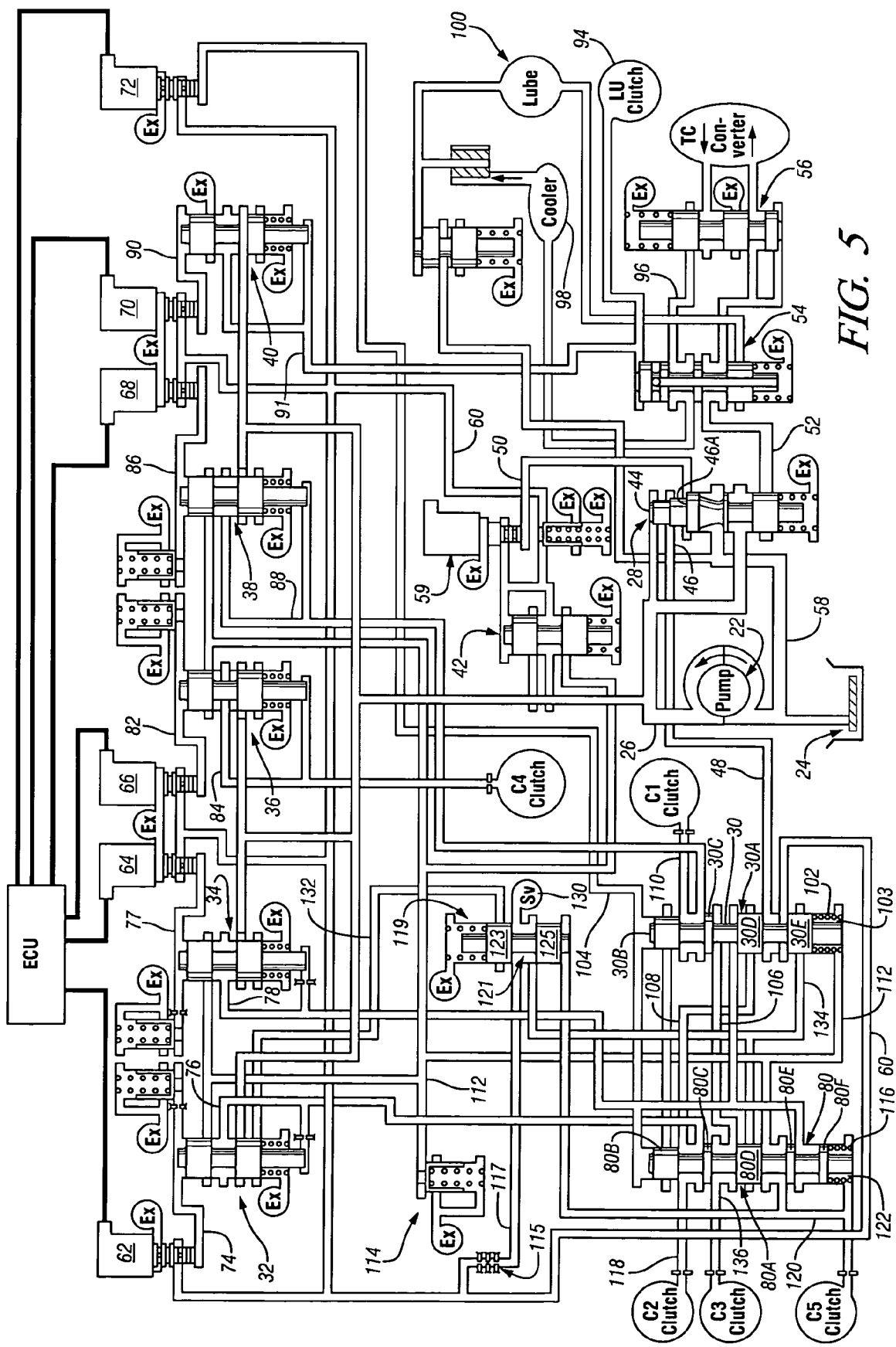
FIG. 5 is a diagrammatic representation of an electronic control system incorporating the present invention and utilized with the power transmission shown in FIG. 1 and conditioned for fourth.
Figure 6:
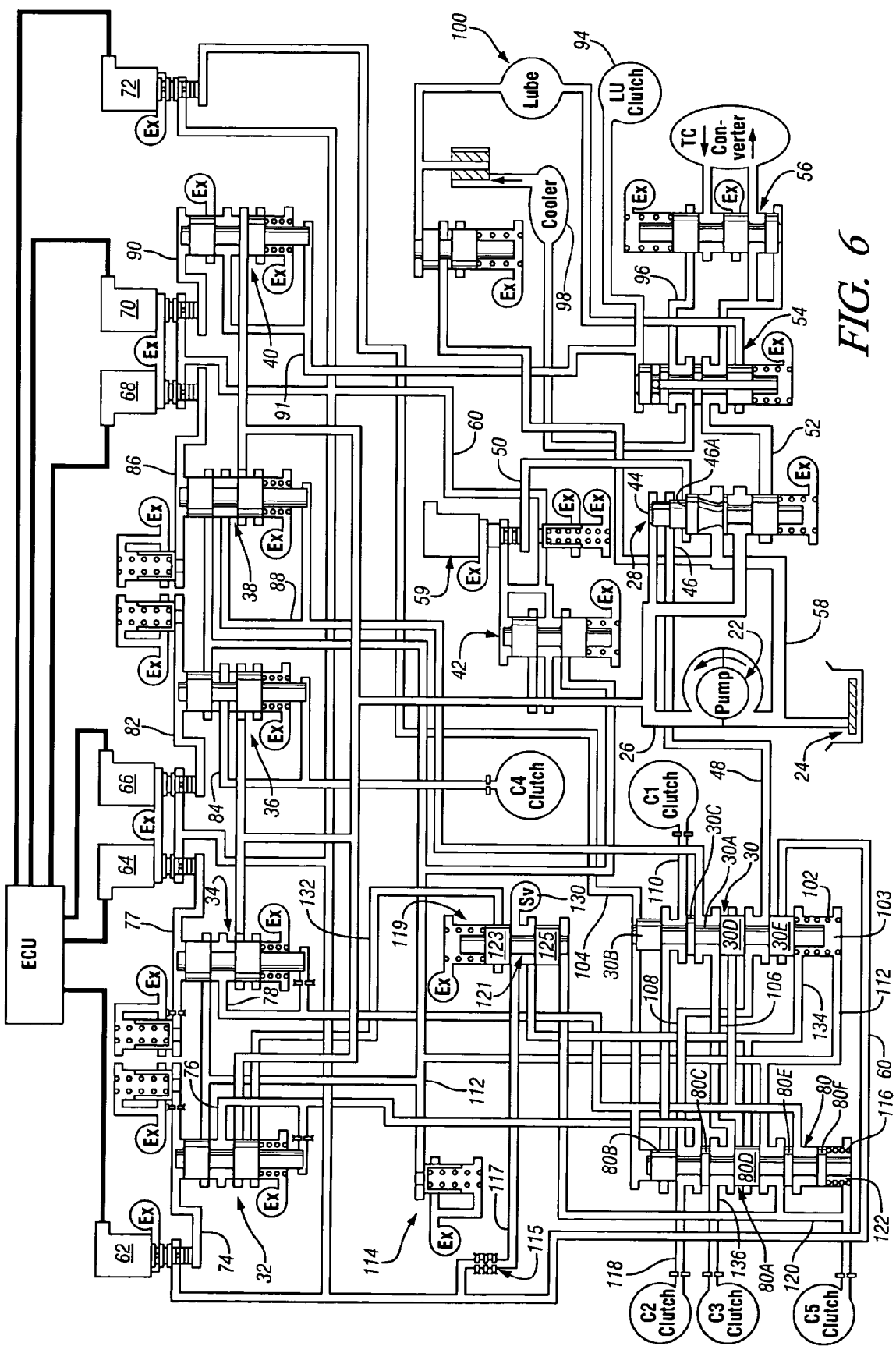
FIG. 6 is a diagrammatic representation of an electronic control system incorporating the present invention and utilized with the power transmission shown in FIG. 1 and conditioned for sixth.

FIG. 5 displays the electro-hydraulic control in the fourth forward range. The logic valve 80 is in the stroked position since the latching pressure at torque-transmitting mechanism C5 was released during a first to second interchange. The torque-transmitting mechanism C2 is engaged by the trim valve 32 and the logic valve 80 is latched in the stroked position. The torque-transmitting mechanism C1 is controlled by the trim valve 38 and the logic valve 30 is latched in the stroked position. The electro-hydraulic control is depicted in sixth forward range in FIG. 6. The torque-transmitting mechanisms C2 and C4 are controlled by the trim valves 32 and 36 respectively, and the solenoid valve 72 is deactivated.

Figure 7:
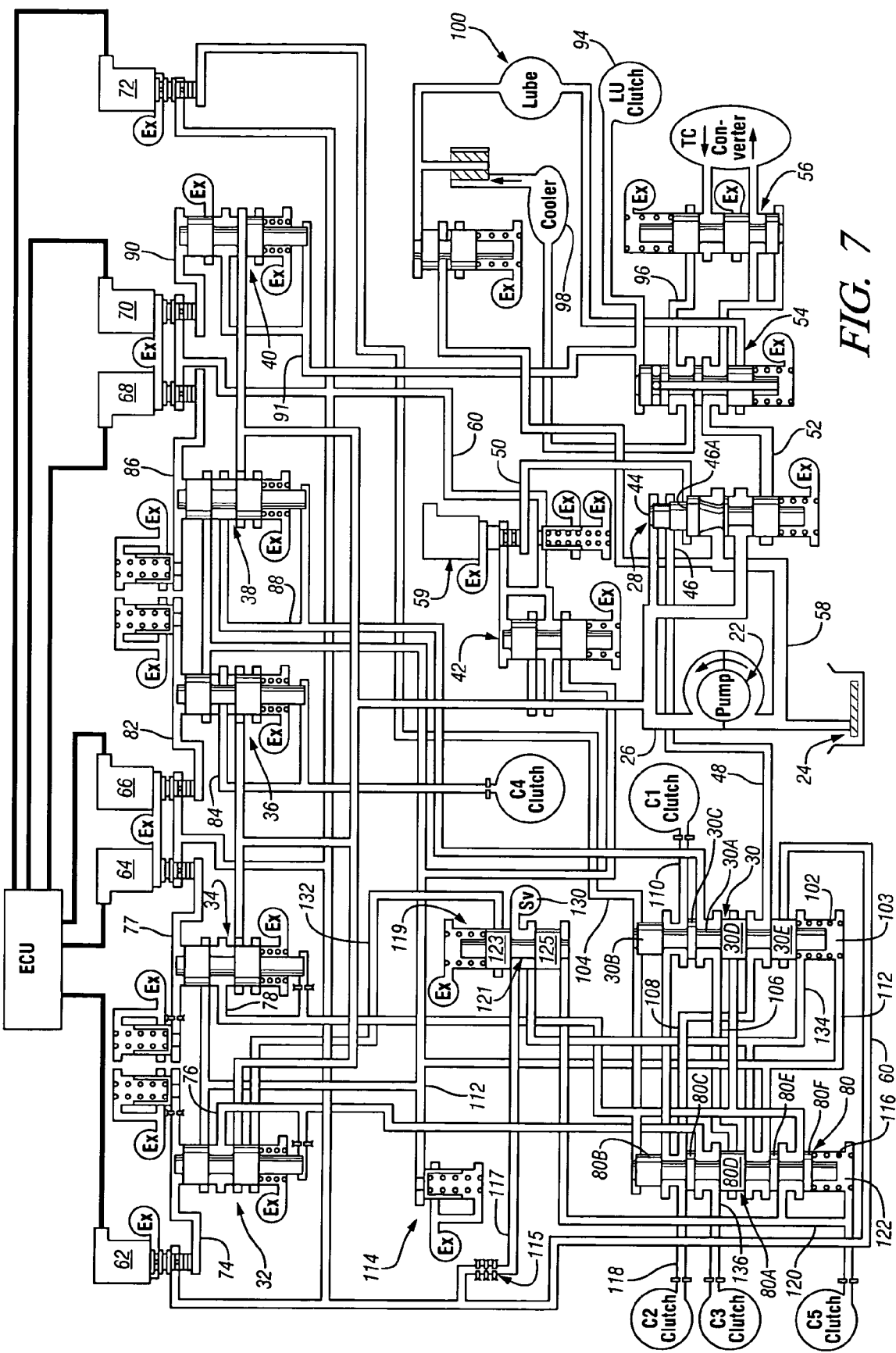
FIG. 7 is a diagrammatic representation of an electronic control system incorporating the present invention and utilized with the power transmission shown in FIG. 1 and conditioned for reverse/neutral power off.
Figure 8:
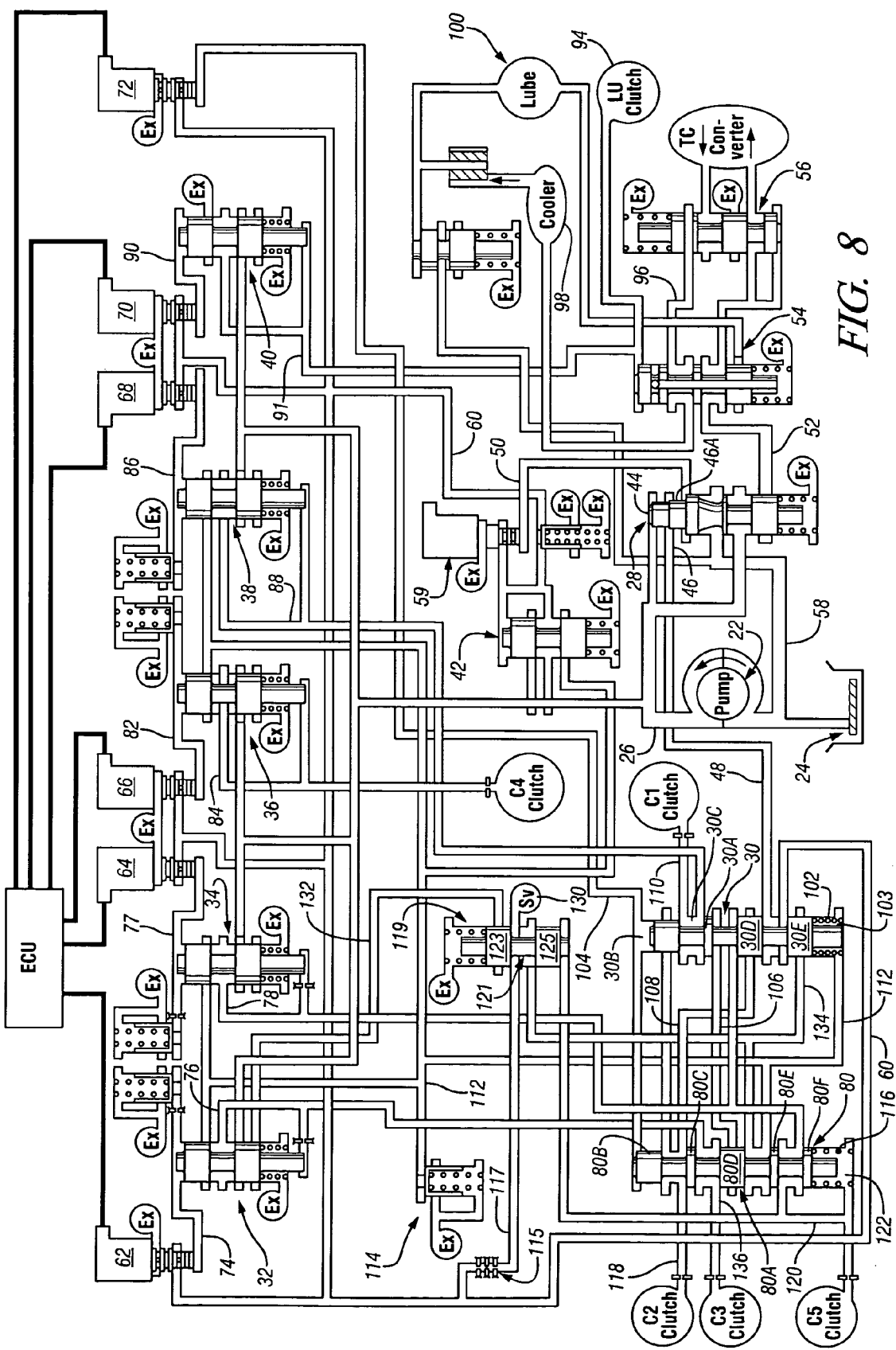
FIG. 8 is a diagrammatic representation of an electronic control system incorporating the present invention and utilized with the power transmission shown in FIG. 1 and conditioned for first through third power off.

In the event of a unintended discontinuance electrical power to the solenoids 62, 64, 66, 68, 70, and 72, the trim valves 32 and 38 will produce maximum output pressure. The remaining trim valves 34, 36, and 40 will have a minimum or zero output pressure. If this discontinuance occurs during reverse or neutral operation, only the torque-transmitting mechanism C3 will be engaged as shown in FIG. 7. If this discontinuance occurs during operation in the first, second, or third forward ranges, the torque-transmitting mechanisms C3 and C1 will be engaged as shown in FIG. 8. In each of these ranges, the torque-transmitting mechanism C1 will have been engaged prior to the discontinuance. The logic valve 80 will return to the unstroked condition and the trim valve 32 will engage the torque-transmitting mechanism C3.

Figure 9:
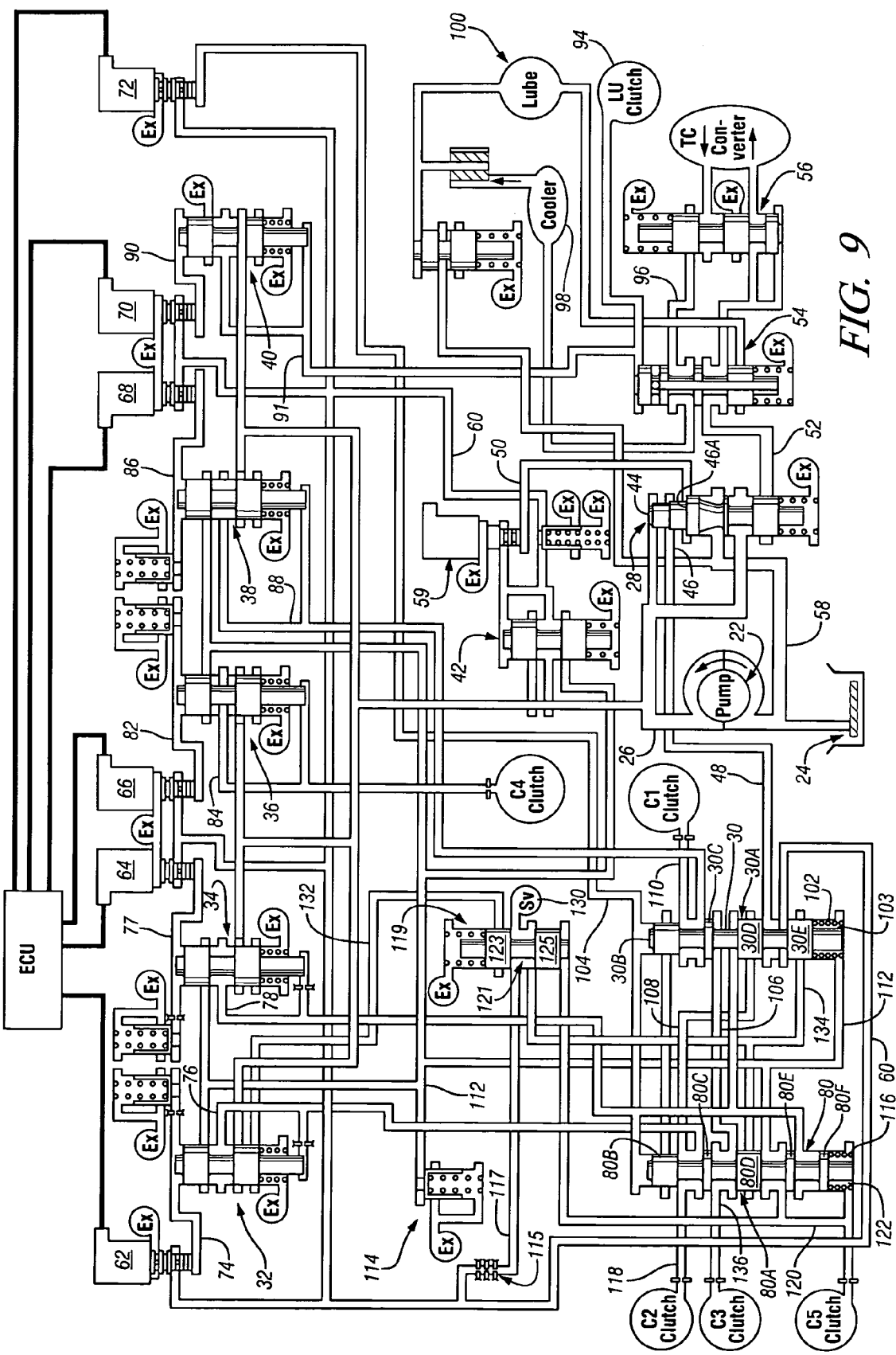
FIG. 9 is a diagrammatic representation of an electronic control system incorporating the present invention and utilized with the power transmission shown in FIG. 1 and conditioned for fourth power off.
Figure 10:
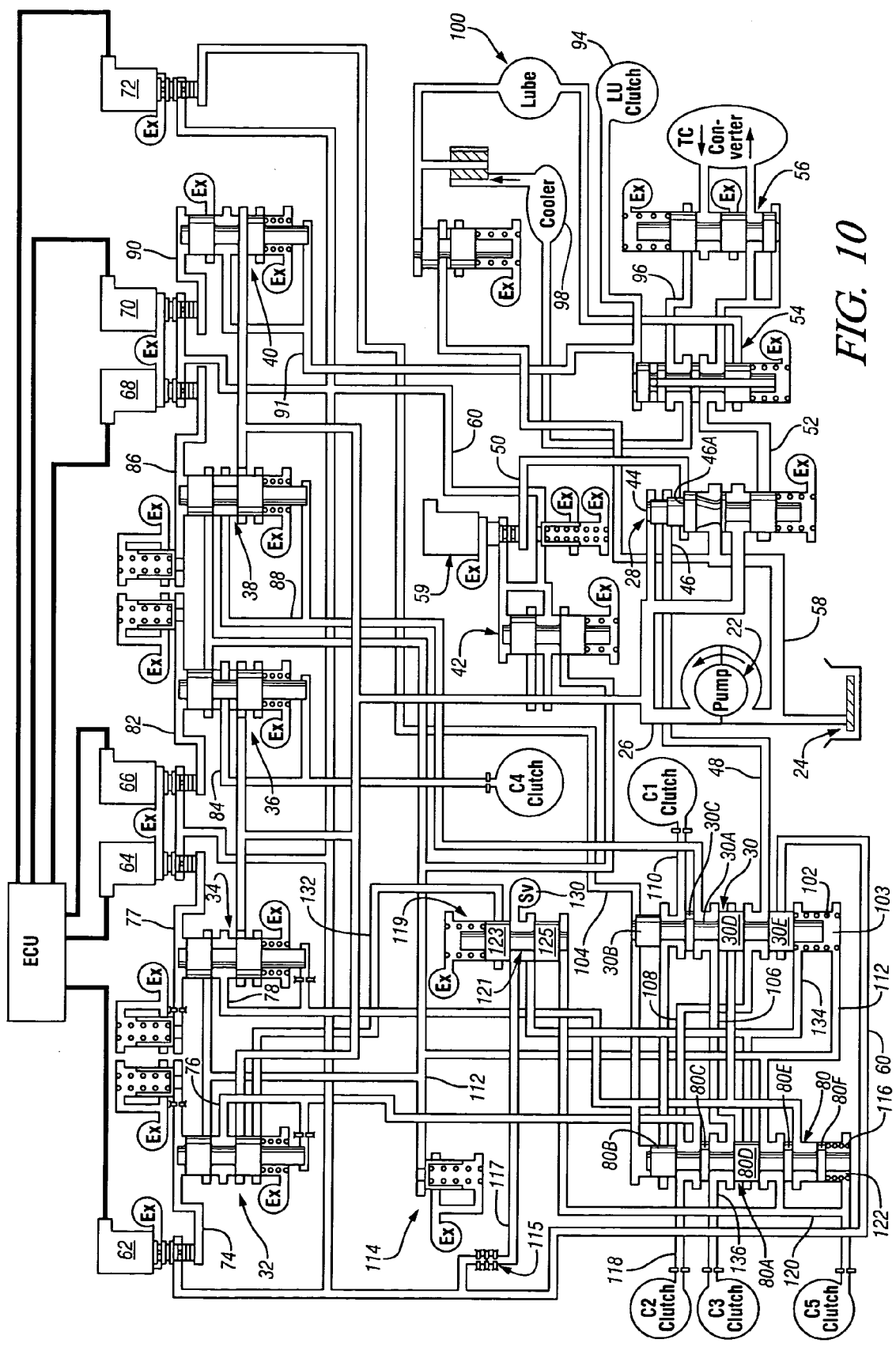
FIG. 10 is a diagrammatic representation of an electronic control system incorporating the present invention and utilized with the power transmission shown in FIG. 1 and conditioned for fifth and sixth power off.

In the event the discontinuance occurs during fourth range operation, the electro-hydraulic control will be in the position shown in FIG. 9. This position is the normal fourth range position as described above in FIG. 5. The logic valves 30 and 80 are both latched in the stroked position by the trim valves 38 and 32 respectively both before and after the discontinuance. If this discontinuance occurs during the fifth or sixth forward ranges, the electro-hydraulic control will be positioned as shown in FIG. 10 and the control will establish the fifth range. The torque-transmitting mechanisms C2 and C3 will be engaged by the trim valves 32 and 38 respectively. Prior to the discontinuance, the logic valve 30 was de-latched during both fifth and sixth range and will remain de-latched. The logic valve 80 was latched by the trim valve 32 during normal operation in fourth, fifth, or sixth ranges and will remain latched.

Following an unexpected discontinuance of electrical power, the electro-hydraulic control will remain in one of the above described conditions (third, fourth, or fifth range) until the engine operation is ceased. This will permit moving of the vehicle in the forward direction to a repair facility where the engine operation can be discontinued, the problem analyzed and the control repaired.

The invention claimed is:

1. An electro-hydraulic apparatus for a power transmission having a plurality of torque-transmitting mechanisms selectively engageable by said apparatus to provide six forward ratio ranges, said electro-hydraulic apparatus comprising:
   a supply of electrical power to activate said electro-hydraulic apparatus;
   first and second logic valves each positionable to a latched position and an unlatched position;
   first and second trim valve means for providing maximum output pressure when said electrical power is discontinued;
   third and fourth trim valves controlled by normally closed solenoid valves that have a minimum output pressure when said electrical power is discontinued;
   said trim valves and said logic valves cooperating to provide control of the torque-transmitting mechanisms to establish said six forward ratios wherein said first trim valve is effective to maintain said first logic valve in said latched position during the first, second, third, and fourth of said forward ratio ranges, said second trim valve is effective to maintain said second logic valve in said latched position during the fourth, fifth, and sixth forward ratio ranges;
   said first trim valve and said first logic valve being effective to maintain a first of said torque-transmitting mechanisms engaged during an electrical power discontinuance occurring in either said third or fourth ratio range, said second trim valve and said second logic valve being effective to maintain a second of said torque-transmitting mechanisms engaged during an electrical discontinuance occurring in said third ratio range, said second trim valve and said second logic valve being effective to maintain said second logic valve stroked and a third of said torque-transmitting mechanisms engaged during an electrical discontinuance occurring in said fourth ratio range, and said first trim valve, said first logic valve in said unlatched position, and said second logic valve in said latched condition cooperating to maintain said second torque-transmitting mechanism engaged during an electrical power discontinuance in said fifth ratio range; and
   said electro-hydraulic apparatus being effective to maintain the transmission in third ratio range in the event of an electrical discontinuance during operation in either said first, second, or third forward ratio range, in said fourth forward ratio range during an electrical discontinuance during operation in said fourth range, and in said fifth forward ratio range in the event of an electrical discontinuance during operation in either said fifth or sixth ratio range.

2. The electro-hydraulic apparatus for the power transmission having the plurality of torque-transmitting mechanisms selectively engageable by said apparatus to provide the six forward ratio ranges, said electro-hydraulic apparatus defined in claim 1 further comprising:
   means for urging said first and second logic valves to said latched position during an interchange from a neutral condition to said first forward range.

3. The electro-hydraulic apparatus for the power transmission having the plurality of torque-transmitting mechanisms selectively engageable by said apparatus to provide the six forward ratio ranges, said electro-hydraulic apparatus defined in claim 1 further comprising:
   means for urging said first and second logic valves to said latched position during an interchange from a neutral condition to said first forward range and said means being discontinued during a ratio interchange from said fifth forward ratio range to said sixth forward ratio range whereby said first logic valve is moved to said unlatched position.

4. The electro-hydraulic apparatus for the power transmission having the plurality of torque-transmitting mechanisms selectively engageable by said apparatus to provide the six forward ratio ranges, said electro-hydraulic apparatus defined in claim 1 further comprising:
   means for urging said first and second logic valves to said latched position during an interchange from a neutral condition to said first forward range, and said means being inoperative during an electrical discontinuance.

5. The electro-hydraulic apparatus for the power transmission having the plurality of torque-transmitting mechanisms selectively engageable by said apparatus to provide the six forward ratio ranges, said electro-hydraulic apparatus defined in claim 1 further comprising:
   means for urging said first and second logic valves to said latched position during an interchange from a neutral condition to said first forward range, said means being discontinued during a ratio interchange from said fifth forward ratio range to said sixth forward ratio range whereby said first logic valve is moved to said unlatched position and said means being inoperative during an electrical discontinuance.

* * * * *